Figure 1:
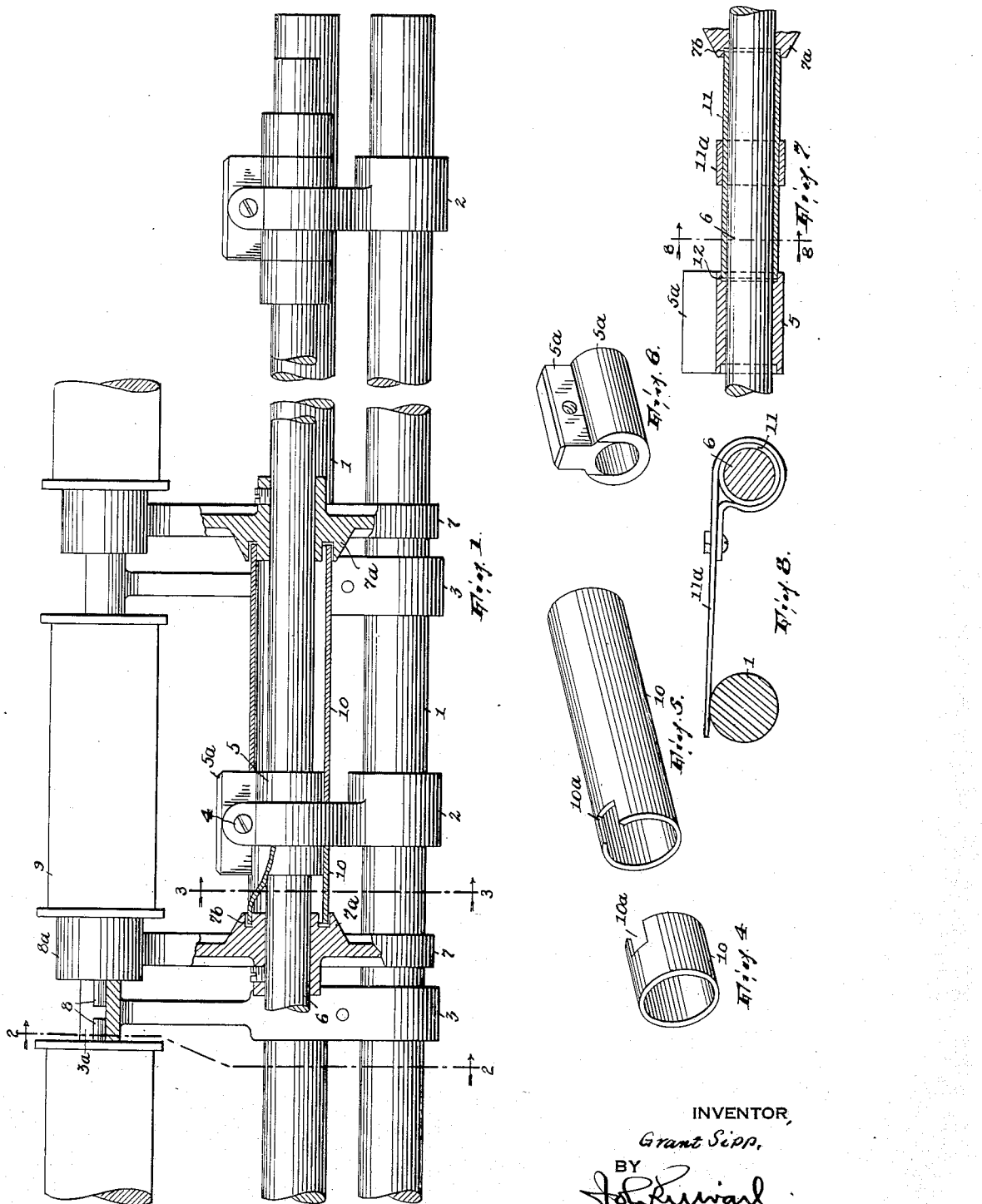

July 17, 1934.  G. SIPP  1,966,740

SHAFT GUARD

Original Filed Sept. 6, 1930  2 Sheets-Sheet 1

INVENTOR,
Grant Sipp,
BY
ATTORNEY

July 17, 1934.  G. SIPP  1,966,740
SHAFT GUARD
Original Filed Sept. 6, 1930    2 Sheets-Sheet 2

INVENTOR,
Grant Sipp.
BY
ATTORNEY

Patented July 17, 1934

UNITED STATES PATENT OFFICE 1,966,740

SHAFT GUARD

Grant Sipp, Paterson, N. J., assignor to Sipp-Eastwood Corporation, Paterson, N. J., a corporation of New Jersey Original application September 6, 1930, Serial No. 480,122, now Patent No. 1,955,100, dated April 17, 1934. Divided and this application March 16, 1934, Serial No. 715,921

3 Claims. (Cl. 64—12)

This application constitutes a division of my application Serial No. 480,122 for patent for Winding machine, No. 1,955,100, dated April 17, 1934.

In a certain class of winding machines a horizontal rotary shaft is journaled in brackets of the frame or fixed structure of the machine and above the shaft are arranged the rotary core-elements (each usually comprising a spindle with a spool thereon) to receive the windings. If the yarn is left hanging from a core-element to which one of said brackets happens to be more or less opposite and wraps and then winds around the shaft close to the bracket bearing for the shaft, which it usually does in a hard compact wound mass, and if further windings form between this mass and the bearing they will become crowded into the bearing and in this way the bearing frequently becomes worn away to such an extent that it is no longer serviceable and has to be replaced by a new one.

To prevent this I provide a guard which houses the shaft and is supported in a novel way between the bracket and the adjoining drive-wheel.

Figure 2:
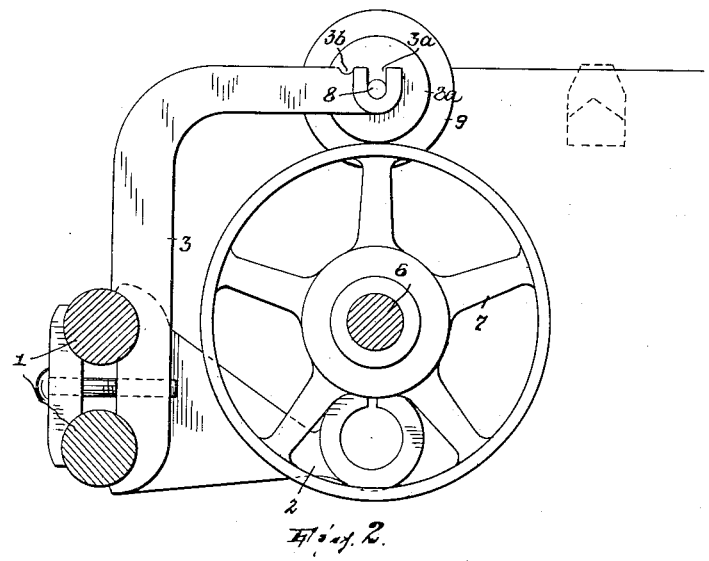
Figure 3:
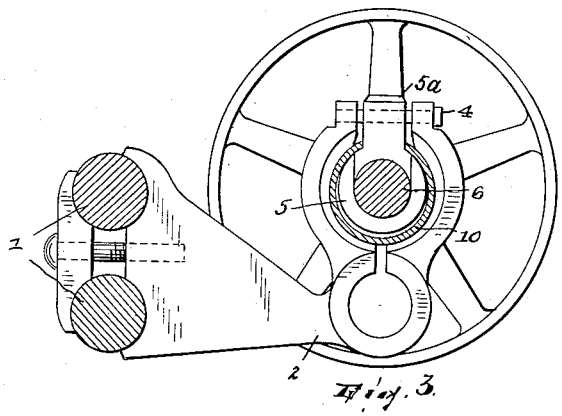

In the drawings,

Fig. 1 is a front elevation of a fragment of so much of a winding machine containing the invention as is necessary to illustrate the latter, certain parts appearing in section and others removed;

Figs. 2 and 3 are sections on line 2—2 and 3—3, Fig. 1;

Figs. 4, 5 and 6 are isometric views of details;

Fig. 7 a modification of the invention largely in section; and

Fig. 8 is a sectional view on line 8—8, Fig. 7.

Fixed supporting structure is represented by the superposed stationary horizontal bars 1 of the machine frame, brackets 2 projecting laterally therefrom and other brackets 3 projecting first upwardly and then laterally from the bars, both sets of brackets being clamped to the bars. The brackets 2, of which there are usually a less number than the brackets 3, have clamped therein by the screws 4 the bearings 5, which may be of Arguto wood or the like making lubrication unnecessary and which project laterally from the brackets, here in both directions. In these bearings is journaled the rotary suitably driven shaft 6 carrying, affixed thereto, the drive-wheels 7, and wherever any such drive-wheel immediately flanks a bracket 2 the drive-wheel has a tapering hub 7a projecting toward and formed with a circumferential groove 7b open toward said bracket. The brackets 3 have notches 3a and 3b (Fig. 2) to receive the ends of the spindle 8 of a core-element which comprises such spindle and a spool 9 thereon; when the spindle ends are engaged in the notches 3a the whirl 8a of the spindle is in peripheral contact with the corresponding drive-wheel and when such ends are engaged in the notches 3b the spindle is supported with its whirl clear of the drive-wheel, or in the rest position. Each bearing 5 is generally cylindrical but has a longitudinal exterior rib or tongue 5a.

10 is the mentioned guard, here a tube having a notch 10a in one end. It is of such diameter as to fit fairly snugly over the projecting portion of the bearing with the rib of the latter engaged in its notch, its other end being received in the groove 7b of the adjoining hub of the drive-wheel; however, this groove is wider than the tube is thick, so that the tube has only limited contact with the hub within the groove at the inner side of the groove and over the shaft, which I find prevents chattering of the guard (held against turning by the interlock at 5a—10a) as an incident of the rotation of the drive-wheel with the shaft.

Wherever a bracket 2 is opposed to a spool and so located as to be between the planes of the ends of such spool, as may be the case as to all the brackets 2 in the machine excepting the extreme end ones, each bracket is flanked at each side (Fig. 1) by one of the guards and coacts with the corresponding drive-wheels to support the two guards in the manner set forth.

When the shaft is in rotation the yarn hanging from any core-element is prevented from access to the shaft by each guard. At the bracket end of such guard it cannot reach the shaft because of the overlap of the guard with the projecting portion of the bearing and at the drive-wheel end it cannot reach the guard because of the lapping relation of the hub and said end; and in the latter case if the yarn should catch on the hub and so tend to wind thereon, due to the taper of the hub and the constricting action of the windings thus forming the latter immediately slip off onto and grip the non-rotating guard, thus preventing a waste of yarn which might otherwise ensue.

In Figs. 7 and 8 the guard, designated 11, is set at its ends in counterbores 12 of the bearing and enlargement formed by the hub 7a of the drive-wheel and it has an arm 11a which may bear against the upper bar 1 to hold the guard from rotation. This construction avoids notching the tube to receive the tongue or rib of the bearing and permits making the guard of smaller diameter.

Given a rotary horizontal element (as the shaft and a drive-wheel 7 thereon) having an enlargement (as the hub 7a of such drive-wheel) and supporting structure having a projecting part (as a bracket 2) spaced from the enlargement and in which said element is journaled and itself having a projection (as the projecting portion of the bearing) surrounding said element and extending toward said enlargement, it is new in this art to provide a substantially tubular guard (as 10) which houses said element between said part and enlargement and is supported at one end by the latter and at the other end laps and is supported by the projection and has a tongue-and-recess interlock (as 5a—10a) with said part holding the guard against rotation; and it is new to provide a substantially tubular guard between said part and enlargement which is supported at one end by said part and held from rotation by said structure (in any manner) and to taper the enlargement, and also provide it with a circumferential groove open, toward said part and causes it to receive in said groove and thereby support the other end of the guard.

Having thus fully described my invention what I claim is:

1. In a winding machine, the combination of a rotated horizontal element having a circumferential enlargement, supporting structure having a projecting part spaced from the enlargement and in which said element is journaled, said part having a projection surrounding said element and extending toward said enlargement, and a substantially tubular guard housing said element between said part and enlargement and supported at one end by the latter and at the other end lapping and supported by the projection and having a tongue-and-recess interlock with said part holding the guard against rotation.

2. In a winding machine, the combination of a rotated horizontal element having a circumferential enlargement, supporting structure having a projecting part spaced from the enlargement and in which said element is journaled, and a substantially tubular guard housing said element between said part and enlargement and supported at one end by said part and held from rotation by said structure, said enlargement being externally tapered, and also having a circumferential groove open toward said part and receiving in the groove and thereby supporting the other end of the guard.

3. In a winding machine, the combination of a rotated horizontal element having a circumferential enlargement, supporting structure in which said element is journaled having a projecting part lateral of and spaced from said enlargement, said enlargement having a circumferential groove open toward said part, and a substantially tubular guard housing said element between said enlargement and part, said guard being in part supported by said part and projecting at one end into the groove of and thereby in part supported by said enlargement and having said end thinner than the groove is wide.

GRANT SIPP.